(12) United States Patent
Tarn

(10) Patent No.: US 10,245,748 B2
(45) Date of Patent: Apr. 2, 2019

(54) METHOD FOR PRODUCING FLOORING MODULES COMPRISING ELEMENTS WITH CURVILINEAR EDGES MADE FROM TIMBER PLANKS HAVING EDGES WITH THE NATURAL CURVATURE OF THE WOODEN MATERIAL

(71) Applicant: Bole OÜ, Paldiski, Harju (EE)

(72) Inventor: Hannes Tarn, Harju (EE)

(73) Assignee: BOLE OÜ, Paldiski (EE)

(*) Notice: Subject to any disclaimer, the term of this patent is extended or adjusted under 35 U.S.C. 154(b) by 455 days.

(21) Appl. No.: 14/911,903

(22) PCT Filed: Jul. 15, 2014

(86) PCT No.: PCT/EP2014/065105
§ 371 (c)(1),
(2) Date: Feb. 12, 2016

(87) PCT Pub. No.: WO2015/022132
PCT Pub. Date: Feb. 19, 2015

(65) Prior Publication Data
US 2016/0185007 A1 Jun. 30, 2016

(30) Foreign Application Priority Data
Aug. 16, 2013 (EE) .................................. 201300031

(51) Int. Cl.
| | | |
|---|---|---|
| B27D 1/00 | (2006.01) | |
| B27F 1/02 | (2006.01) | |
| E04F 15/04 | (2006.01) | |
| G05B 19/4097 | (2006.01) | |

(52) U.S. Cl.
CPC .................. *B27D 1/00* (2013.01); *B27F 1/02* (2013.01); *E04F 15/042* (2013.01); *E04F 15/048* (2013.01); *G05B 19/4097* (2013.01); *G05B 2219/45044* (2013.01)

(58) Field of Classification Search
CPC .................................................. G05B 19/4097
USPC ................ 144/382, 384, 386, 389, 391, 394
See application file for complete search history.

(56) References Cited

FOREIGN PATENT DOCUMENTS

| CH | 698 020 B1 | 4/2009 | |
|---|---|---|---|
| DE | 298 12 919 U1 | 12/1998 | |
| DE | 10 2007 006631 A1 | 8/2007 | |
| EP | 1437456 A1 * | 7/2004 | ............. B27M 3/04 |

(Continued)

OTHER PUBLICATIONS

Bolefloor: "Installing Curv8" Jul. 23, 2013 (Jul. 23, 2013). XP054975510. Retrieved from the Internet: URL:http://www.youtube.com/watch?v=qeNmy7hQnDQ [retrieved on Sep. 10, 2014] the whole document.

(Continued)

*Primary Examiner* — Matthew Katcoff
(74) *Attorney, Agent, or Firm* — Ladas & Parry LLP

(57) ABSTRACT

Present invention relates to a method for producing flooring modules comprising elements with curvilinear edges made from timber planks having edges with the natural curvature of the wooden material. Every single module comprises multiple elements, which are intended to be laid down in the module in adjacent rows in pairs, where the joint of row is of each displaced in relation to the adjacent row and the ends of each row of elements in the module are also displaced in relation to each other.

12 Claims, 3 Drawing Sheets

(56) References Cited

FOREIGN PATENT DOCUMENTS

| EP | 2 295 215 A1 | 3/2011 |
| WO | 2006/005209 A1 | 1/2006 |
| WO | 2010/022493 A1 | 3/2010 |

OTHER PUBLICATIONS

"Making a Bolefloor", Aug. 1, 2012 (Aug. 1, 2012), XP054975457, Retrieved from the Internet: URL:http://www.youtube.com/watch?v=x_YlnbBLBJE [retrieved on Jul. 17, 2014] the whole document.
English Translation, "Das Leben ist keine Gerade", Jul. 18, 2012 (Jul. 18, 2012), XP055130111, Retrieved from the Internet: URL:http://www.joerg-waidelich.de/pdf/bole_floor_2012 [retrieved on Jul. 18, 2014].
CH 698 020 B1_English_Abstract.
EP 2 295 215 A1_English_Abstract.
DE 10 2007 006631 A1_English_Abstract.

\* cited by examiner

METHOD FOR PRODUCING FLOORING MODULES COMPRISING ELEMENTS WITH CURVILINEAR EDGES MADE FROM TIMBER PLANKS HAVING EDGES WITH THE NATURAL CURVATURE OF THE WOODEN MATERIAL

RELATED APPLICATION

This application is a national phase entry under 35 USC 371 of International Patent Application No PCT/EP2014/065105 filed on 15 Jul. 2014, which claims priority from Estonian Application No. P201300031 filed on 16 Aug. 2013.

TECHNICAL FIELD

Present invention relates to a method for producing flooring modules comprising elements with curvilinear edges made from timber planks having edges with the natural curvature of the wooden material.

BACKGROUND ART

In the prior art there are several solutions known for manufacturing floor boards, floor panels or other panels with edges following natural curvature of the wooden material.

Swiss patent CH698020B1 (Peter Herzog-Schymura, publ. 30 Apr. 2009) discloses a process of manufacturing solid wooden boards from multiple adjacent wooden elements, which are connected by the edges along the connecting lines following as closely as possible the natural curvature of the elements. The wooden board to be manufactured is for example a table top, a flooring element (i.e. floor panel) or a planar furniture element, etc.

European patent application EP2295215A1 (Rudolf Meyer, publ. 16Mar. 2011) discloses a method and device for manufacturing solid wood plates from unedged timber planks. The device comprises a detection unit such as a digital camera, which is used for scanning unedged planks and said data is stored in a computer database, and a computer device for calculating on the basis of the data stored in the computer database a cutting line for two adjacent planks having a curvilinear edge. The device includes a cutting device for cutting out said cutting lines and a corresponding working station for joining said cut planks into plates.

German utility model DE29812919U1 (Willi Schmidt, publ. 17 Dec. 1998) discloses plates made of several planks having curvilinear edges, where two adjacent planks include for a tongue-and-groove joint at the edge of one plank a tongue and the other plank includes a groove at the corresponding edge.

German patent application DE102007006631A1 (Dieter Karsten Herrmann, publ. 16 Aug. 2007) discloses a process for manufacturing of flooring, wall or ceiling covering from the planks having natural curvature. In this solution every single plank also is scanned and the data obtained so is stored in the computer database. The data obtained by scanning includes among other things the full-size image of the plank. For example by using CAD-program scanned images of the planks are placed on the floor area image to be covered and into the edges of the adjacent planks cutting lines are generated in a semiautomatic or full-automatic mode. Every single plank is then cut out in the CNC cutting machine according to the cutting lines.

None of the above methods are suitable for producing flooring modules comprising elements with curvilinear edges following the natural curvature of the planks from which said elements are made of, where modules are consisting a predetermined number of elements and for producing of a every single element are selected namely these timber planks which shape suits best for producing specific element, i.e. the needed shape of the element is obtained with minimum machining.

DISCLOSURE OF INVENTION

The aim of the present invention is to provide a method for producing flooring modules comprising elements with curvilinear edges made from timber planks having edges with the natural curvature of the wooden material, where in the manufacturing stage of the elements of the modules the machining said elements is minimized as much as possible by carefully selecting and matching the shapes of the timber planks (i.e. wooden material) used for making said modules.

The aim of the present invention is also to enable more efficient use of the timber planks (i.e. wooden material) by matching of the shapes of the timber planks used for making specific elements of the modules. This in turn reduces the amount of wooden residues such as sawdust and chips generated in the process and it also prolongs the lifetime of the cutting instruments used, which in turn reduces the downtime. This also reduces the overall energy consumption of the process.

The present invention relates to a method for producing flooring modules comprising elements with curvilinear edges following the natural curvature of the timber planks from which said elements are made of.

Single module consists of multiple elements, which in the module are intended to be laid next of each other paired in rows. In each module the butt joint of the elements in each row is offset in respect of the butt joint of the elements in the next row and at the ends of the module the ends of different element rows are displaced so that the shape of one end of the assembled module corresponds to the shape of the other end of the module so that the module can be prolonged with the other identical module.

The shape of the one lateral edge of the module corresponds to the shape of the other (i.e. opposite) lateral edge of the module so that to the modules in succession in one row it is possible to lay adjacently a another row of the modules so that the butting ends of an another row of modules are offset relative to the butting ends of the modules in the previous row.

Method includes steps in which for producing modules the number of rows of elements in a module and contour data of edges and ends for each element of the module are specified and saved into the computer database.

Contour data of timber planks used for producing module elements are scanned into the computer database, whereby said data includes at least the length, width, thickness and contour data of edges of timber planks.

For distributing timber planks scanned into the computer database for producing corresponding elements of the module, the contour data of the timber planks scanned into the computer database are compared with the contour data of each element of the module and in case of suitability of the specified minimal and maximum overlap during the comparison of contour data of elements, said timber plank scanned into the computer database is selected for manufacturing respective element of the module, for which the contour of the compared timber plank matches closest when considering the minimal and maximum overlap.

According to the second preferred embodiment of the invention the distribution of timber planks scanned into the computer database for producing of respective elements of the module is carried out at least in two steps: in the first step the contour data of the timber planks scanned into the computer database are compared with the contour data of each element of the module and in case of suitability of the specified minimal and maximum overlap during the comparison of contour data of elements, said timber plank scanned into the computer database is selected for manufacturing respective element of the module, for which the contour of the compared timber plank matches closest when considering the minimal and maximum overlap.

Those timber planks, which are left over and are not selected for producing of any element in the first step of distribution for the reason of unsuitability of specified minimum and maximum overlap, are distributed in a second step of selection for producing of these elements of the module, when said timber plank having a minimal overlap in respect of contour shape of respective element, for which in the first step of distribution there was insufficient number of timber planks having suitable shape.

Thus it is achieved that during producing of elements for modules there will not occur shortage of timber planks for producing some element, as depending on the distribution of contours of timber planks there may emerge a situation where for producing elements for the modules the timber planks available are not distributed equally among elements.

Next there are three possible ways of manufacturing of elements of the module depending on whether it is desired to produce solid wood elements or laminate elements.

In the embodiment for producing of solid wood elements the selected timber planks for producing of elements are sawn into solid wood elements, whereby the edges of the planks are cut into a shape corresponding to the edges of respective elements, for which the timber plank was selected/screened for during the previous step of distribution.

According to the first embodiment of producing laminate elements timber planks selected for producing laminate elements are sawn into veneer planks, each veneer plank is glued onto a substrate for producing a respective element and the edges of laminate element formed by veneer plank glued onto a substrate are cut according to the contour of edges of the respective element, for which the timber plank, from which the veneer plank was obtained, was selected/screened for in the previous distribution step.

According to the second embodiment of producing laminate elements, a lamellae veneer plank pack obtained from the same trunk as consecutively sliced veneer planks, which are fixed against displacement relative each other (so called lamellae pack), is treated during scanning as a single timber plank and after distributing said pack according to contours of module elements, individual veneer planks are separated and glued onto the substrate, whereupon the edges of laminate element formed by veneer plank glued onto a substrate are cut according to the contour of edges of the respective element, for which the veneer plank pack, from which the veneer plank was obtained, was selected and/or screened for in the previous step of distribution.

Preferably plywood, fibreboard or chipboard is used as a substrate for manufacturing laminate elements.

In most preferred embodiments of both solid wood elements and laminate elements, upon cutting out a contour of each element, into the one longer edge of the element a tongue and into its opposite edge a groove is cut, respectively, and into one end of the element a tongue and into its opposite end a groove is cut.

According to another embodiment of both solid wood elements and laminate elements, upon cutting out of the contour of each element of the module, grooves are cut into all edges and ends of the elements. In a further embodiment a groove is cut into longer edges and into one end of the elements and tongue is cut into its second end.

Mainly for the solid wood modules for the terraces, the edges of module elements may be carried out without tongue and groove or the groove is cut into one end the module and the tongue is cut into the other end of the module and the longer edge of the elements is left without groove.

The modules produced according to the method of the invention comprise either four elements paired in two rows or six elements paired in three rows or eight elements paired in four rows or ten elements paired in five rows.

The number of elements in module and the shape of elements are recorded into computer database prior to the production of modules.

The contour data of edges and ends for each element of the module may be formed manually.

Preferably, the contour data comprising contours of the edges and ends of each element of the module recorded into the computer database have been generated on a basis of a timber planks cut from certain wood species, covering as wide and/or as comprehensive as possible selection of scanned contour data and division of timber planks into groups according to the similarity of their edge contours, taking into account the selected number of elements and number of rows of elements in the module.

Preferably the edge contours of each element of the module are generated following the natural curvature of the edges of the respective group of timber planks, whereat upon generation of edge contours is taken into consideration the possibility of matching the elements side-by-side.

In other words, in order to minimise the machining of timber planks with edges having natural curvature for obtaining module elements, the data of the edge contours of timber planks scanned into the computer database are mutually compared and based on the similarity of these contours the optimum number of elements in the module is established, taking into the consideration for example the specific wood species.

Thereby it is possible to select the contours of edges of the elements inside of the module as closely as possible following the natural curvature of timber planks in order maximally minimise the amount of material cut off from timber plank edges. This saves material and decreases wearing of cutting instruments, which in turn reduces manufacturing costs.

The restricting criterions in connection with the module are that the ends of the module must permit joining of the module with the next identical module. The joints of the next row of modules, adjacent to the first row of modules, must preferably be offset relative to the joints of previous row of modules.

Additionally, at the ends of a module, the ends of different rows of elements must be offset relative each other so, that within the module, the joint of each row of elements is offset relative to the joint of the next row of elements.

Thus, for example, in the case of modules installed on the floor, the perceivability and/or distinguishability of the pattern repetitiveness of the modules is minimised and in addition the wood material is saved in a situation where the length of the room does not match exactly with the covering length of a module.

Most preferably, upon producing elements from timber planks, in addition to the required overlapping of the blanks, the running direction of wood grain relative to the edge of respective element is taken into account. In other words, the grain ought to run possibly similar to longer edges of the respective element and not to intersect with the edge contour of the element.

BRIEF DESCRIPTION OF DRAWINGS

Next the method according to the present invention is described with the help of the exemplary embodiment with references to the attached schematic drawings, where.

BEST MODE FOR CARRYING OUT THE INVENTION

In the appended drawings the module and its elements according to the invention are depicted schematically and in a simplified manner.

Specific embodiment illustrates the method according to the invention by means of a module, consisting from eight elements $A_1$ to $A_8$, which in a module stand in pairs in four rows.

Contour lines of module elements $A_1$ to $A_8$ are not straight but they are curvilinear.

Upon producing of a module the shape of module contour and contours of elements forming a module and joints of the elements are specified beforehand.

For this purpose a contour data of as many timber planks as possible is scanned into the computer database (at least contour data of 100 000 timber planks of certain wood species, as for example European white oak), where the edges of the planks are unedged, i.e. they have natural curvature.

Additionally the size of the module, such as the number of the elements in the module, depends on the packaged size and weight of a single module, in order the module to be convenient for the customer to transport and manipulate with.

For example during the tests it has been found that for the parquet quality planks available from European white oak according to Gaussian distribution, the suitable module made from this wood species consists of eight elements.

Figure 1:
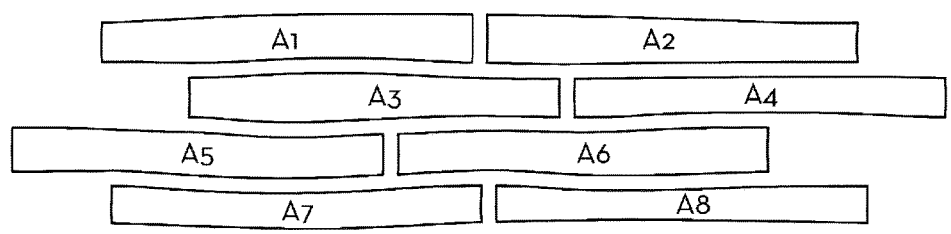
FIG. 1 shows an exploded view of an embodiment of the module according to the invention, consisting from eight elements in four rows.
Figure 2:
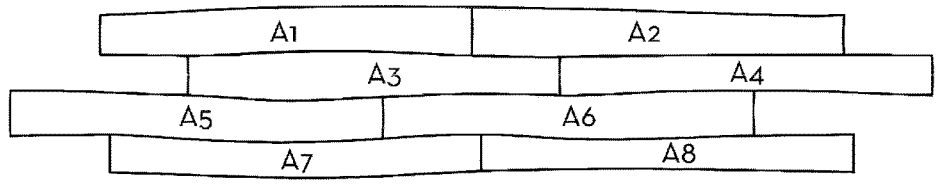
FIG. 2 shows module according to FIG. 1 in an assembled state, where elements are assembled tightly side by side.
Figure 3:
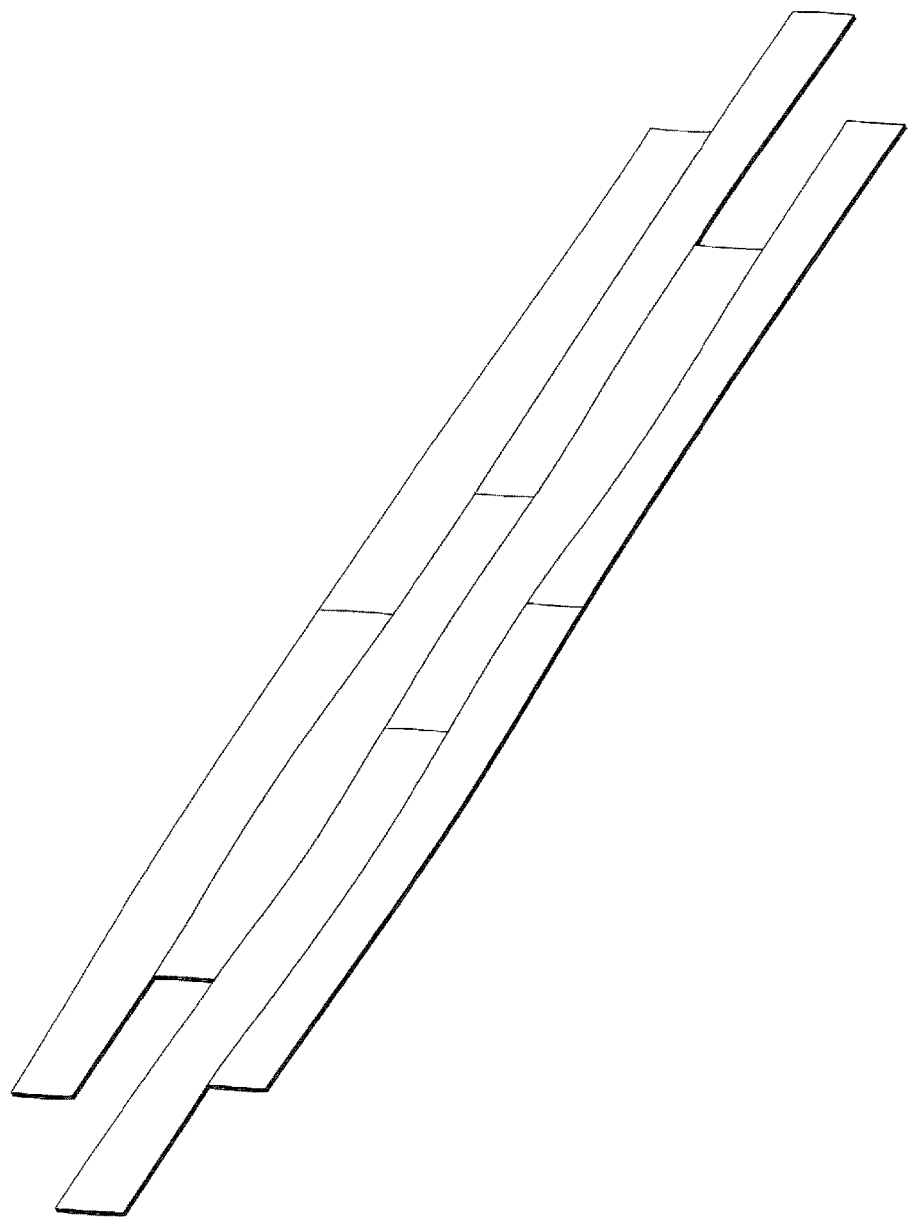
FIG. 3 shows an axonometric view of the module according to FIG. 1.
Figure 4:
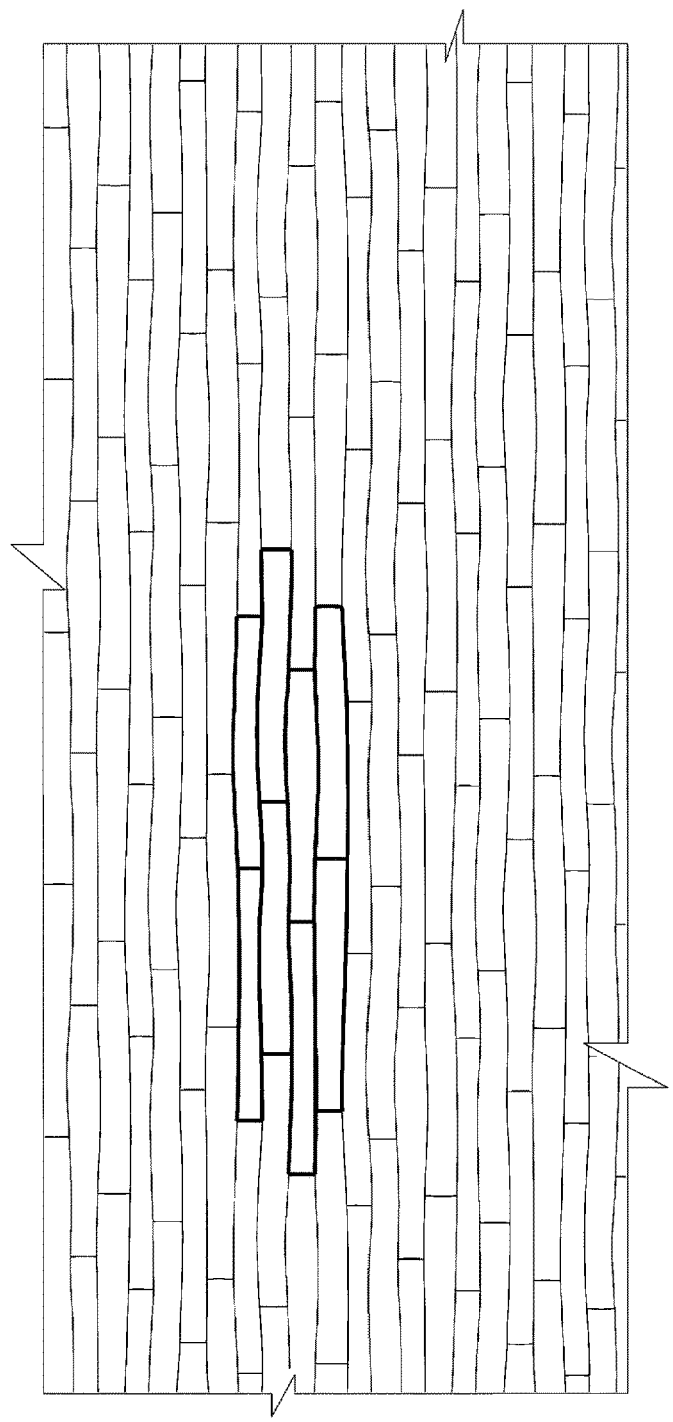
FIG. 4 shows the module (bold line) according to FIG. 1 installed on the floor between other identical modules.

The module is formed with serrated ends such that the ends of the element rows forming the module are not flush. In case of module so formed the repetitiveness of module contour in finished floor (FIG. 4) is not easily noticeable.

Next the contour data of the timber planks stored into the computer database are sorted according to similarity of their contours into eight groups. When forming of contour groups with the possibility of laying them down side-by-side, a minimal possible machining requirement for forming contour of elements is also taken in consideration in order to be able to lay those elements down side-by-side. In addition to contour, the presence or absence of tongue and groove joints at the edges and at the ends of the element has to be taken into account, when cutting lines of the element are determined.

When elements of the module and their contours have been determined, they are recorded into the computer database and during manufacturing process each timber plank, i.e. its contour data, is scanned and recorded into the computer database. Thereafter, based on the scanned timber planks contour data, the timber planks are sorted (distributed) according to suitability of their contours (according to the minimal or maximum overlap and/or direction of wood grain) for producing specific module elements.

These timber planks that during first sorting due to limiting criteria (for example minimal or maximum overlap, suitability of wood graine, etc) was not selected for producing specific elements, is used for producing such module elements for which upon first sorting there occurred shortage of timber planks. Timber planks poorly fitted or having theoretically large loss of wood (loss of material) are not used—they are used in production of other products.

The next step depends on whether solid wood elements or laminate elements are produced.

When laminate elements are produced, the timber planks are cut into veneer planks and veneer planks are glued onto the substrate.

When producing laminate elements from sliced veneer plank pack, the previous steps are carried out with the sliced veneer plank pack, where the lamellae veneer planks are obtained from the same trunk as consecutively sliced veneer planks, which are fixed against displacement relative each other so that in the process the veneer plank pack is treated during scanning as a single timber plank.

Thereafter the manufacturing of solid wood elements and laminate elements is practically identical.

According to the sorting result of specific timber plank for producing elements of the module, the edges and ends of the plank are cut according to the contour of the corresponding element of the module. Cutting is usually carried out by CNC cutting machine.

This may be followed by treatment of elements face (floor surface).

The elements of single module (in present case elements $A_1$ to $A_8$ in the drawings) are packed into single package.

It is clear to the skilled in the art that the invention is not limited to the above described example, but within the scope of appended claims there are possible several different embodiments.

The invention claimed is:

1. A method for producing a flooring module comprising a plurality of rows of elements with each row comprising a pair of the elements, with the pair of elements in each row adjoining each other at a butt joint, with the respective butt joints of the elements of each row being staggered with respect to the butt joint of an adjacent row, and with the pair of elements in each row having ends that are staggered with respect to ends of the pair of elements in an adjacent row, the method comprising:
   (a) selecting a number of the rows in the module;
   (b) providing a number of timber planks of a selected wood species, each of the timber planks comprising a plurality of edges with each of the edges having a curved contour;
   (c) scanning the number of timber planks into a computer database;
   (d) sorting scanned timber planks into a plurality of groups according to the number of rows in the module selected in step (a) and a resulting number of elements in the module and based on a similarity of curved contours of respective edges of the scanned timber planks such that the curved contours of the respective edges of a scanned timber plank in each group are more similar to curved contours of edges of other timber planks in the same group than to the curved contours of edges of a timber plank in a different group;

(e) generating in the computer database data representing virtual contours for edges of each of the plurality of elements in the module so that a virtual contour of each of the plurality of elements follows generally a curved contour of an edge of a timber plank in one of the plurality of groups;

(f) selecting scanned timber planks in each of the groups by matching contours of respective of the scanned timber planks with the virtual contours of respective of the elements; and (g) cutting the timber planks selected in step (f) so that the curved contours of respective edges of the selected cut timber planks match the virtual contours for the edges of the plurality of elements generated in the computer database.

2. The method according to claim 1, wherein the number of timber planks provided in step (b) is such that the respective groups contain a sufficient number of timber planks to form a plurality of the flooring modules.

3. The method according to claim 2, wherein the number of timber planks provided in step (a) is at least 100,000.

4. The method according to claim 3, wherein the module comprises four of the elements paired in two rows or six of the elements paired in three rows or eight of the elements paired in four rows.

5. The method according to claim 1, wherein the selecting in step (f) comprises:

comparing the scanned timber planks scanned into the computer database with the virtual contours for edges of each of the plurality of elements in the module, and selecting scanned timber planks based on a predetermined minimal and maximum overlap between respective of the timber planks and respective of the elements.

6. The method according to claim 5, wherein the scanned timber planks that do not meet the predetermined minimal and maximum overlap are selected if there are an insufficient number of timber planks and if they meet the predetermined minimal overlap.

7. The method according to claim 1, comprising in step (g), cutting all edges of the selected timber planks to form grooves.

8. The method according to claim 1, wherein the timber planks provided in step (b) are solid wood.

9. The method according to claim 1, further comprising assembling the selected cut timber planks into the floor module.

10. A method for producing a flooring module comprising a plurality of rows of elements with each row comprising a pair of the elements, with the pair of elements in each row adjoining each other at a butt joint, with the respective butt joints of the elements of each row being staggered with respect to the butt joint of an adjacent row, and with the pair of elements in each row having ends that are staggered with respect to ends of the pair of elements in an adjacent row, the method comprising:

(a) selecting a number of the rows in the module;

(b) providing a number of timber planks of a selected wood species, each of the timber planks comprising a plurality of edges with each of the edges having a curved contour;

(c) scanning the number of timber planks into a computer database;

(d) sorting scanned timber planks into a plurality of groups according to the number of rows in the module in step (a) and a resulting number of elements in the module and based on a similarity of curved contours of respective edges of the scanned timber planks such that the curved contours of the respective edges of a scanned timber plank in each group are more similar to curved contours of edges of other timber planks in the same group than to the curved contours of edges of a timber plank in a different group;

(e) generating in the computer database data representing virtual contours for edges of each of the plurality of elements in the module so that a virtual contour of each of the plurality of elements follows generally a curved contour of an edge of a timber plank in one of the plurality of groups;

(f) selecting scanned timber planks in each of the groups by matching contours of respective of the scanned timber planks with the virtual contours of respective of the elements;

(g) sawing the timber planks selected in step (f) into veneer planks;

(h) gluing the veneer planks onto a substrate to produce laminate elements; (i) cutting the laminate elements so that the curved contours of respective edges of the laminate elements match the virtual contours for the edges of the plurality of elements generated in the computer database.

11. The method according to claim 10, wherein the substrate is plywood, fibreboard, or chipboard.

12. A method for producing a flooring module comprising a plurality of rows of elements with each row comprising a pair of the elements, with the pair of elements in each row adjoining each other at a butt joint, with the respective butt joints of the elements of each row being staggered with respect to the butt joint of an adjacent row, and with the pair of elements in each row having ends that are staggered with respect to ends of the pair of elements in an adjacent row, the method comprising:

(a) selecting a number of the rows in the module;

(b) providing a number of lamellae veneer plank packs, wherein a lamellae veneer plank pack is obtained from a same trunk, the lamellae veneer plank pack comprising a plurality of edges with each of the edges having a curved contour;

(c) scanning the number of lamellae veneer plank packs into a computer database, wherein the lamellae veneer plank pack is scanned as a single timber plank;

(d) sorting scanned lamellae veneer plank packs into a plurality of groups according to the number of rows in the module selected in step (a) and a resulting number of elements in the module and based on a similarity of curved contours of respective edges of the scanned lamellae veneer plank packs such that the curved contours of the respective edges of a scanned lamellae veneer plank pack in each group are more similar to curved contours of edges of other lamellae veneer plank packs in the same group than to the curved contours of edges of a lamellae veneer plank pack in a different group;

(e) generating in the computer database data representing virtual contours for edges of each of the plurality of elements in the module so that a virtual contour of each of the plurality of elements follows generally a curved contour of an edge of a lamellae veneer plank pack in one of the plurality of groups;

(f) selecting scanned lamellae veneer plank packs in each of the groups by matching contours of respective of the scanned lamellae veneer plank packs with the virtual contours of respective of the elements;

(g) separating a lamellae veneer plank pack selected in step (f) into individual veneer planks and gluing the individual veneer planks on a substrate to produce a laminate element; and (h) cutting the laminate element so that the curved contours of respective edges of laminate elements match the virtual contours for the edges of the plurality of elements generated in the computer database.

\* \* \* \* \*